United States Patent
Woo et al.

(10) Patent No.: US 9,442,788 B2
(45) Date of Patent: Sep. 13, 2016

(54) BUS PROTOCOL CHECKER, SYSTEM ON CHIP INCLUDING THE SAME, BUS PROTOCOL CHECKING METHOD

(71) Applicant: SAMSUNG ELECTRONICS CO., LTD., Suwon-si, Gyeonggi-do (KR)

(72) Inventors: Deum-Ji Woo, Yongin-si (KR); Yong Je Lee, Suwon-si (KR); Young-Jun Kwon, Seongnam-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 152 days.

(21) Appl. No.: 14/199,088

(22) Filed: Mar. 6, 2014

(65) Prior Publication Data

US 2014/0281759 A1    Sep. 18, 2014

(30) Foreign Application Priority Data

Mar. 15, 2013    (KR) .......................... 10-2013-0028242

(51) Int. Cl.
*G06F 11/00* (2006.01)
*G06F 11/07* (2006.01)
*G06F 13/42* (2006.01)

(52) U.S. Cl.
CPC ....... *G06F 11/0766* (2013.01); *G06F 11/0745* (2013.01); *G06F 13/4217* (2013.01); *G06F 2213/0038* (2013.01)

(58) Field of Classification Search
CPC . G06F 11/0745; G06F 11/3027; G06F 13/42
See application file for complete search history.

(56) References Cited

U.S. PATENT DOCUMENTS

| | | |
|---|---|---|
| 4,545,055 A | 10/1985 | Patel |
| 5,099,480 A | 3/1992 | Murata |
| 5,751,975 A | 5/1998 | Gillespie et al. |
| 6,000,040 A * | 12/1999 | Culley et al. ................... 714/31 |
| 6,678,645 B1 | 1/2004 | Rajsuman et al. |
| 6,766,479 B2 | 7/2004 | Edwards, Jr. |
| 7,627,800 B2 | 12/2009 | Aldereguia et al. |
| 7,668,202 B2 | 2/2010 | Gillet |
| 8,966,327 B1 * | 2/2015 | Wang .............................. 714/49 |
| 2002/0183956 A1 * | 12/2002 | Nightingale .................. 702/120 |
| 2003/0101384 A1 * | 5/2003 | Jo .................................. 714/43 |
| 2005/0021305 A1 * | 1/2005 | Alexanian et al. ........... 702/186 |
| 2007/0260914 A1 * | 11/2007 | Pogrebinsky ..................... 714/5 |

(Continued)

FOREIGN PATENT DOCUMENTS

| | | |
|---|---|---|
| JP | 08-297588 | 11/1996 |
| KR | 100256965 | 5/2000 |

(Continued)

*Primary Examiner* — Philip Guyton
(74) *Attorney, Agent, or Firm* — F. Chau & Associates, LLC

(57) ABSTRACT

A system on chip (SoC) includes a system bus; a plurality of intellectual properties (IPs) outputting bus signals via the system bus; and one or more checkers disposed to correspond to at least some of the plurality of IPs, wherein the checker includes: a first environment setting register for setting information about a check target and list, on which a bus protocol check operation will be performed, wherein the setting may be variable according to an access from outside via the system bus; and a check logic receiving the bus signal and performing a bus protocol check operation on a signal included in the bus signal according to the information set in the first environment setting register.

16 Claims, 16 Drawing Sheets

(56) References Cited

U.S. PATENT DOCUMENTS

2012/0226949 A1* 9/2012 Palus .................. G06F 11/10
 714/48
2013/0219452 A1* 8/2013 Liu et al. .................. 726/1

FOREIGN PATENT DOCUMENTS

| KR | 1020050037220 | 4/2005 |
|---|---|---|
| KR | 1020070063124 | 6/2007 |

* cited by examiner

FIG. 8

| Check Logic | | |
|---|---|---|
| Target | LIST | #of Sub Check logic |
| ID0 | AXI_ERRM_WDATA_NUM | 1 |
| ID0 | AXI_ERRS_BRESP_ALL_DONE_EOS | 2 |
| ID1 | AXI_ERRM_AWID_X | 3 |
| ID2 | AXI_ERRM_WDATA_NUM | 4 |
| ID2 | AXI_ERRS_BRESP_ALL_DONE_EOS | 5 |

⋮

BUS PROTOCOL CHECKER, SYSTEM ON CHIP INCLUDING THE SAME, BUS PROTOCOL CHECKING METHOD

CROSS-REFERENCE TO RELATED APPLICATIONS

This application claims priority to Korean Patent Application No. 10-2013-0028242, filed on Mar. 15, 2013, in the Korean Intellectual Property Office, the disclosure of which is incorporated by reference in its entirety herein.

BACKGROUND

1. Technical Field

Exemplary embodiments of the inventive concept relate to a system-on-chip (SoC), and more particularly, to a bus protocol checker, a system including the bus protocol checker, and a bus protocol checking method.

2. Discussion of Related Art

An SoC is an integrated circuit (IC) that can integrate several components of a computer or other electronic systems into a single chip. In electronic design, a semiconductor intellectual property (IP) core or IP block is a reusable unit of logic, a cell, or chip layout design that is the intellectual property of one party. Each IP block may be configured to communicate information using a different bus protocol. Accordingly, a large SoC may include several IP blocks using several different bus protocols. However, due to the different bus protocols, it can be difficult to construct an SoC that enables all of the IP blocks to communicate with one another.

SUMMARY

At least one embodiment of the inventive concept provides a bus protocol checker capable of improving the efficiency of a bus protocol check operation, a system-on-chip (SoC) including the bus protocol checker, and a bus protocol checking method.

According to an exemplary embodiment of the inventive concept, there is provided a system on chip (SoC) including: a system bus; a plurality of intellectual properties (IPs) outputting bus signals via the system bus; and one or more checkers disposed to correspond to at least some of the plurality of IPs, wherein the checker includes: a first environment setting register for setting information about a check target and list, on which a bus protocol check operation will be performed; and a check logic receiving the bus signal and performing a bus protocol check operation on at least some of signals included in the bus signal according to the information set in the first environment setting register. The setting may vary according to access (e.g., a change request message) from the outside via the system bus.

The checker may further include an error information output logic for outputting error information including information about the check target and list, in which an error occurs, in response to a result of the bus protocol check operation from the check logic.

The check logic may include a plurality of sub-check logics performing bus protocol check operations with respect to different check lists.

Each of the plurality of sub-check logics may change a check list that will undergo a bus protocol check operation according to change in the information set in the first environment setting register.

The checking signal generator may generate a check start signal, a check end signal, an operation signal, and an error signal as the check signals from the signals corresponding to the check lists from among the signals included in the bus signal.

The system bus may transfer a bus signal having an advanced extensible interface (AXI) protocol.

The checker may further include an error compensator that compensates for a bus protocol error, and the error compensator may include: a second environment setting register for setting information about a target and a list, a bus protocol error of which is to be compensated for; and a compensation unit performing a bus protocol error compensation operation according to the information set in the second environment setting register, and outputting the error compensated bus signal to the system bus. The setting of the second environment setting register may vary according to access from the outside via the system bus.

The compensation unit may receive an access request signal via the system bus, may generate a fake response signal in response to the access request signal, and output the fake response signal to the system bus as the error compensated bus signal.

The compensation unit may include a plurality of error compensation logics for performing error compensation operations on signals transferred through different channels.

The compensation unit may further include a passage selection unit that selectively outputs one of a bus signal with error compensation and a bus signal without error compensation, according to the information set in the second environment setting register.

According to an exemplary embodiment of the present inventive concept, there is provided a bus protocol checker including: a check logic connected between a system bus in a system on chip (SoC) and an intellectual property (IP); an environment setting register for setting information about a check target and list, on which a bus protocol check operation will be performed; and an error information output logic for outputting error information according to a bus protocol check result from the check logic, wherein the check logic may include a plurality of sub-check logics performing bus protocol check operations with respect to check lists according to the information set in the environment setting register, from among a plurality of check lists. The setting may vary according to an access from outside via the system bus.

According to an exemplary embodiment of the present inventive concept, there is provided a bus protocol checking method in a system on chip (SoC), the method including: storing information about check targets and check lists, on which a bus protocol check operation will be performed, in an environment setting register; receiving, by a checker, a bus signal from an intellectual property (IP) that has received a request for access; performing a bus protocol check operation on the bus signal with respect to a check list selected according to the information stored in the environment setting register; and outputting error information corresponding to a result of the bus protocol check operation via a system bus of the SoC. The check list, on which the bus protocol check operation is to be performed, may be changed according to a change in the information stored in the environment setting register. The checker may include a check logic including a plurality of sub-check logics, and each of the plurality of sub-check logics changes the check list, in which the bus protocol check operations will be performed, in response to a change in the information stored in the environment setting register. The plurality of sub-check logics may perform the bus protocol check operations by generating the same kind of check signals with respect to different check lists. The bus protocol checking method in the SoC may further include: generating an error compensated bus signal based on the error information and outputting the error compensated bus signal to the system bus.

According to an exemplary embodiment of the present inventive concept, there is provided a system on chip (SoC) including: a system bus; a plurality of intellectual properties (IPs) outputting bus signals via the system bus; and bus protocol checkers disposed to correspond to at least some of the plurality of IPs to change check targets and check lists according to environment setting information and to output error information according to a result of a bus protocol check operation; and an error compensator generating an error compensated bus signal in response to the error information, and outputting the error compensated bus signal to the system bus. The bus protocol checker may include a check logic configured to perform the bus check operations with respect to a plurality of check lists selected according to the environment setting information, where the check logic performs the bus protocol check operation by generating the same kind of check signals with respect to the plurality of check lists.

According to an exemplary embodiment of the inventive concept, a system on chip (SoC) includes a system bus, a first device configured to output a request message via the system bus, a second device configured to output a data message in response to the request message, and a checking unit. The checking unit is located between the second device and the system bus. The checking unit is configured to determine whether the data message has a bus protocol error, and output to the system bus, one of i) the data message with compensation that corrects the protocol error and ii) a pre-defined data message that conforms to the bus protocol, based on a mode of the SoC. The SOC may further include a second checking unit located between the first device and the system bus, and configured to output the pre-defined message to the system bus when the second device is powered down.

BRIEF DESCRIPTION OF THE DRAWINGS

Exemplary embodiments of the inventive concept will be more clearly understood from the following detailed description taken in conjunction with the accompanying drawings in which:

FIG. 8 is a table showing examples of error targets and error lists of a checker according to an exemplary embodiment of the present inventive concept;

DETAILED DESCRIPTION

Figure 1:
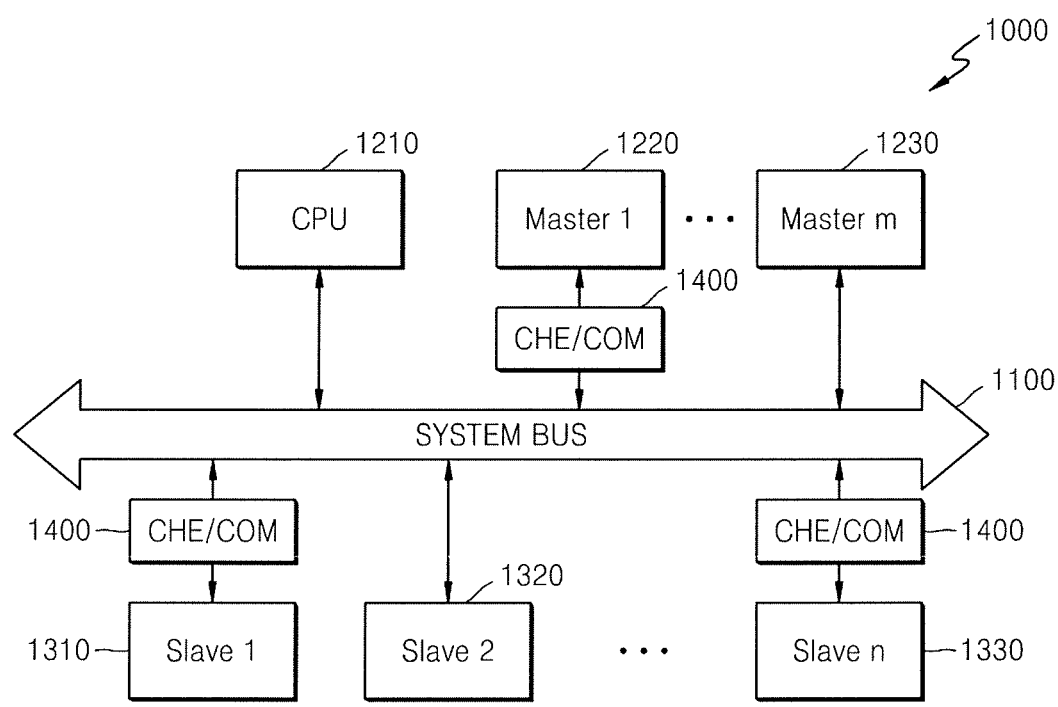
FIG. 1 is a block diagram of a system-on-chip (SoC) according to an exemplary embodiment of the present inventive concept.

The inventive concept will now be described more fully with reference to the accompanying drawings, in which exemplary embodiments of the inventive concept are shown. It should be understood, however, that there is no intent to limit exemplary embodiments of the inventive concept to the particular forms disclosed, but conversely, exemplary embodiments of the inventive concept are to cover all modifications, equivalents, and alternatives falling within the spirit and scope of the inventive concept. Like reference numerals denote like elements in the drawings. As used herein, the singular forms "a", "an", and "the" are intended to include the plural forms as well, unless the context clearly indicates otherwise FIG. 1 is a block diagram of a system on chip (SoC) 1000 according to an exemplary embodiment of the present inventive concept. An SoC is configured by integrating a system having various functions on a semiconductor chip, and a plurality of intellectual properties (IPs) may be integrated in the SoC. Each of the IPs performs its own function within the SoC.

As shown in FIG. 1, the SoC 1000 includes a system bus 1100, and IPs connected to the system bus 1100. As examples of the IPs, a central processing unit (CPU) 1210, master IPs 1220 and 1230, slave IPs 1310, 1320, and 1330 may be located in the SoC 1000. A bus protocol checker 1400 (hereinafter, referred to as a checker) that checks a protocol of bus signals transferred between the IPs is further included in the SoC 1000 according to an exemplary embodiment of the inventive concept. The checker 1400 may be disposed to correspond to each of the IPs included in the SoC 1000. For example, the checker 140 may correspond to at least some of the IPs included in the SoC 1000, and the checker 1400 may not be disposed with respect to the other IPs. For example, a checker 1400 may be located between some of the IPs and the system bus 1100, and not located between other IPs and the system bus 1100. In an exemplary embodiment, when the checker receives a message from the system bus 1100 or a message from the IP it is attached, the checker is configured to determine the communication bus protocol type of the message and to determine whether the message has any errors.

The system bus 1100 may be realized as a bus to which a protocol having a predetermined bus standard is applied. For example, an advanced microcontroller bus architecture (AMBA) protocol of advanced RISC machine (ARM) may be applied as the bus standard. Bus types of the AMBA protocol may include advanced high-performance bus (AHB), advanced peripheral bus (APB), advanced extensible interface (AXI), AXI4, and AXI coherency extensions (ACE). Among the above bus types, AXI is an interface protocol between the IPs, and provides a multiple outstanding address function and a data interleaving function. Besides, other types of protocol, such as uNetwork of SONICs Inc., CoreConnect of IBM Inc., or open core protocol of OCP-IP may be applied to the system bus 1100. However, the inventive concept is not limited to any particular bus protocol.

Each of the various IPs shown in FIG. 1 may be realized as a functional block performing its own function, and the IPs may be classified as master IPs 1220 and 1230 and slave IPs 1310, 1320, and 1330 according to whether the IP has an authority to use the system bus 1100. For example, upon receiving a request message via the bus 1100 from a master IP, a slave IP may be configured to transmit a data message across the bus 1100 to the requesting master IP or perform and/or perform an operation. In an exemplary embodiment, the CPU 1210 shown in FIG. 1 corresponds to a master IP. In addition, a memory controller, a microprocessor, a digital signal processor (DSP), and a moving picture experts group (MPEG) processor may serve as the master IPs 1220 and 1230. The slave IPs 1310, 1320, and 1330 are controlled by the master IPs 1220 and 1230, and an input/output device and a memory may serve as the slave IPs.

The checker 1400 receives bus signals (messages) transmitted/received between the IPs and performs a bus protocol check on the bus signals. For example, when there is a data access request (e.g., a request message) to one slave IP (for example, a first slave IP 1310), a bus signal (e.g., a data message) is provided from the first slave IP 1310 to the corresponding checker 1400, and the checker 1400 receiving the bus signal performs a bus protocol check operation on the bus signal and outputs error information or status information according to the check result. In an exemplary embodiment, the checker 1400 performs a compensation operation according to the bus protocol check result. According to an exemplary embodiment of the present inventive concept, the compensation operation is a partial error compensation type in which a compensation value (or compensation data) is generated when a bus protocol error occurs, or a batch type error compensation for concealing an IP at which a bus protocol error occurs.

The bus protocol checking of the SoC 1000 may be performed at various levels. For example, an internal operation of an independent IP may be checked by using a logic simulation program in a register transfer level (RTL), or at a gate level in which gates that actually perform the operation of the SoC is realized. A checker that is not combinable may have a restricted test pattern due to a limitation in time in developing simulations. A checker that is not synthesizable may be used in a field programmable gate array (FPGA) or in an actual chip, but has a limitation in test lists and checking targets, and accordingly, has a narrow checkable region. The checker 1400 according to an exemplary embodiment of the inventive concept performs the bus protocol checking function by using codes representing hardware, which may be used in the FPGA or the actual chip, as well as the RTL, and detailed operations will be described below. For example, a hardware description language can be used to represent a circuit, where the developer declares registers and combinational logic.

Figure 2A:
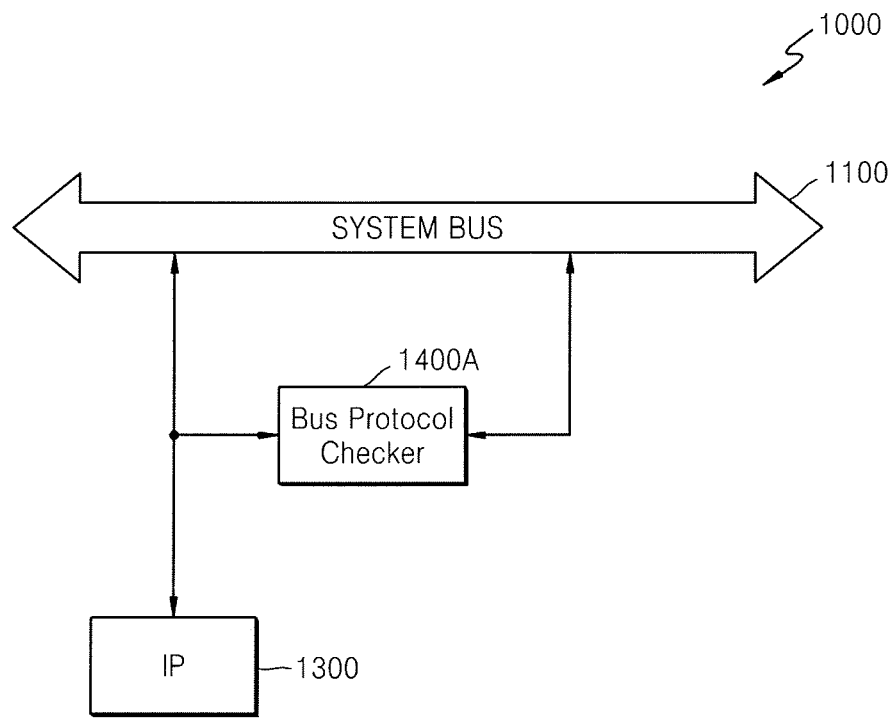
FIGS. 2A and 2B are block diagrams of a checker shown in FIG. 1 according to exemplary embodiments of the inventive concept.
Figure 2B:
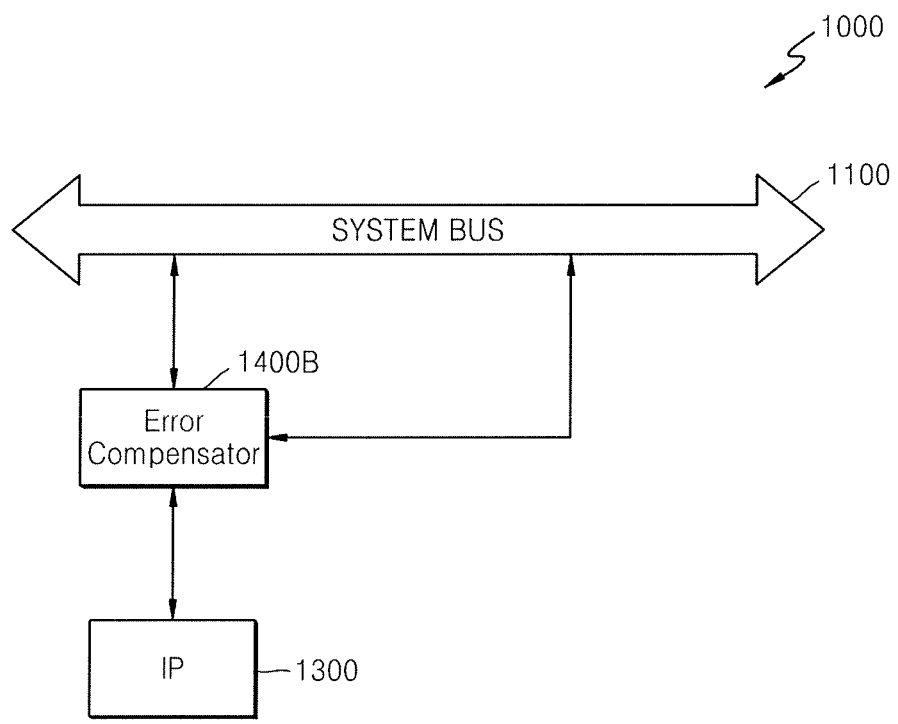

FIGS. 2A and 2B are block diagrams showing the checker 1400 of FIG. 1 according to exemplary embodiments of the inventive concept. FIG. 2A shows an embodiment in which the checker 1400 of FIG. 1 includes a bus protocol checker 1400A performing a bus protocol check according to an exemplary embodiment of the present inventive concept, and FIG. 2B shows an embodiment in which the checker 1400 of FIG. 1 includes an error compensator 1400B performing a bus protocol error compensation according to an exemplary embodiment of the present inventive concept.

As shown in FIG. 2A, the SoC 1000 includes the bus protocol checker 1400A that is connected between the system bus 1100 and an IP 1300 to perform a bus protocol check operation on a bus signal. The IP 1300 may be one of various IPs shown in FIG. 1. The bus protocol checker 1400A may further include an environment setting register (not shown) for setting a checking environment (e.g., a mode), in addition to the bus protocol checking function. According to an access request to the IP 1300 in the SoC 1000, a bus signal is provided from the IP 1300 to the bus protocol checker 1400A, and the bus protocol checker 1400A performs checking operations on the bus signal about the checking targets and checking lists based on the setting information of the environment setting register (not shown). The checking result may be provided to the other IPs (for example, a master IP) via the system bus 1100. For example, the setting register may indicate the types of message protocols to check for, the fields within each protocol to check for, the attributes of those fields (e.g., length, location), and what are considered to be valid values for those fields. The setting register may also indicate whether the checking is to be performed or should be skipped.

As shown in FIG. 2B, the SoC 1000 includes the error compensator 1400B that is connected between the system bus 1100 and the IP 1300 to perform an error compensation operation on the bus signal. Although not shown in FIG. 2B, a checker to which a different checking type is applied may be included in the SoC 1000, and the error compensator 1400B may receive an error checking result and may perform an error compensation operation based on the result. As described above, the error compensator 1400B may perform the error compensation operation by applying a partial error compensation method or a batch type error compensation method.

Figure 3:
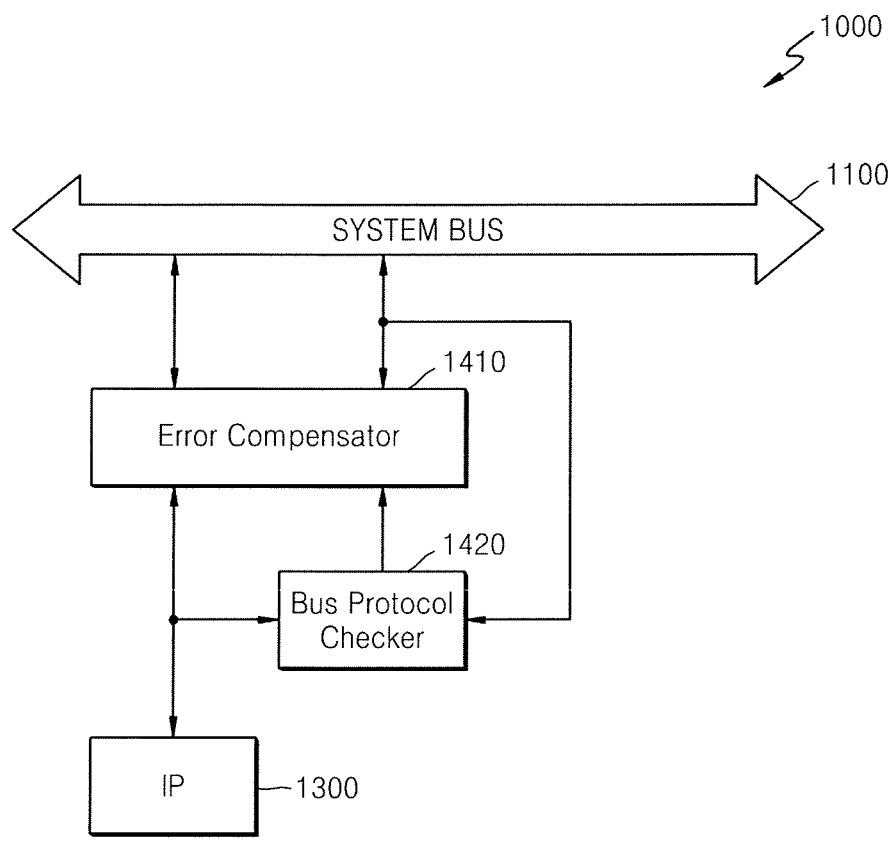
FIG. 3 is a block diagram of an SoC according to an exemplary embodiment of the present inventive concept.

FIG. 3 is a block diagram showing an example of realizing an SoC according to an exemplary embodiment of the present inventive concept, and shows an example where the checker 1400 of FIG. 1 has the bus protocol checking function and the error compensation function described with reference to FIGS. 2A and 2B. As shown in FIG. 3, the checker 1400 according to the present embodiment includes an error compensator 1410 and a bus protocol checker 1420. The error compensator 1410 and the bus protocol checker 1420 may be connected between the system bus 1100 and the IP 1300 to respectively perform an error compensation operation and a bus protocol check operation. A bus signal from the IP 1300 is provided respectively to the error compensator 1410 and the bus protocol checker 1420. The bus protocol checker 1420 performs the checking operation about a predetermined checking target and the checking list according to environment information set therein, and outputs error information to the error compensator 1410 if there is a bus protocol error. For example, if the bus protocol checker 1420 determines that the message sent by the IP 1300 is of a first protocol type, but it includes one or more non-conforming fields, the error information could include the protocol type, and the identities and/or locations of the non-conforming fields.

The error compensator 1410 performs an error compensation operation on the bus signal, in which the error occurs, according to a compensation principle according to the internal environment information. The internal environment information may indicate whether or not to perform any compensation, and what type of compensation to be performed. The error compensator 1410 receives information about the checking target and the checking list in which the error occurs as error information from the bus protocol checker 1420, and may perform a compensation operation on the bus signal based on the error information. The error compensator 1410 may compensate for the bus protocol error by generating at least a part of the bus signal (for example, data information) or generating an entire bus signal by using a set value of its own. For example, if one or more the data fields in the message are inconsistent with the particular protocol, the error compensator 1410 can replace the data field with conforming data or adjust the data field until it is conforming. For example, if a data field is expected to be 4 bits and only has 3 bits, the error compensator 1410 could insert an additional bit into the data field. The environment setting operations performed by the error compensator 1410 and the bus protocol compensator 1420 may be performed when control signals from the outside are transferred to environment setting registers (not shown) included respectively in the error compensator 1410 and the bus protocol checker 1420 via the system bus 1100.

Figure 4:
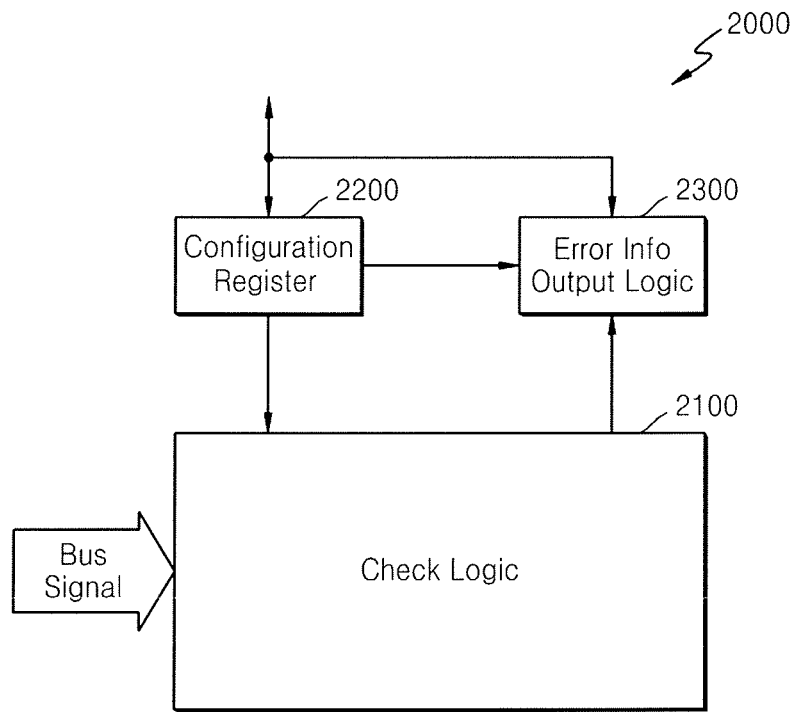
FIG. 4 is a block diagram of a checker shown in FIG. 1 according to an exemplary embodiment of the inventive concept.

FIG. 4 is a block diagram showing an example of the checker 1400 shown in FIG. 1 according to an exemplary embodiment of the inventive concept. As shown in FIG. 4, a checker 2000 includes a check logic 2100, an environment setting register (e.g., a configuration register) 2200, and an error information output logic 2300. The checker 2000 may be a synthesizable bus protocol checker, and receive a bus signal from an IP to perform a bus protocol check operation about a checking target and a checking list.

The environment setting register 2200 stores environment setting information relating to the checking operation of the checker 2000. The environment setting register 2200 may store information about the checking target and the checking list of the bus signal. Some of the signals that are checked during a simulation process may be excluded from the check lists in the synthesizing process, or some more signals may be added as the checking lists in the synthesizing process.

Also, in the environment setting register 2200, information relating to an error information output operation of the error information output logic 2300 may be set. The information stored in the environment setting register 2200 may be changed by accessing the environment setting register 2200 via the system bus (not shown) from the outside. The information stored in the environment setting register 2200 when driving the SoC is provided to the check logic 2100 and the error information output logic 2300, and accordingly, the bus protocol checking environment is set.

The check logic 2100 receives the bus signal, and performs the bus protocol check operation about the checking target and the checking list according to the set checking environment. The bus signal has a signal structure according to the defined bus protocol, and the bus protocol check operation is performed on at least some of a plurality of signals (fields) included in the bus signal (message). As another example, when a transaction is performed according to an AXI protocol, the bus signal may include signals (fields), such as address information, valid information, and ready information, as well as data information. In addition, the check logic 2100 may perform the bus protocol check operation on at least some of the signals based on the information stored in the environment setting register 2200. For example, the information stored in the environment setting register 2200 could include the expected locations, sizes, or size ranges of the fields.

For example, at least some of transactions transferred between IPs are selected as the checking targets, and the checking operations with respect to one or more lists of the selected transactions may be performed. For example, according to the AXI protocol, ID information representing a transferring direction of the corresponding transaction may be included in the bus signal, and the bus signal having the set ID information is selected as the checking target. In addition, the bus protocol check operation may be performed with respect to the signals (fields) that are set as the checking lists from among the at least some signals included in the bus signal. For example, a checking list may include all the fields of a particular bus protocol that should be checked for within a target bus signal.

The error information output logic 2300 may perform an error information output operation based on the information stored in the environment setting register 2200, and receives the bus protocol checking result about the checking targets (e.g., the bus signals to check) and the checking lists (e.g., the fields to check) from the check logic 2100. The error information output logic 2300 provides the error information via the system bus in response to the checking result, and the error information may include information relating to the checking targets and lists, errors of which are detected through the bus protocol check operation. For example, the error information may identify which bus signal has an error and which field within the bus signal has an error.

Figure 5:
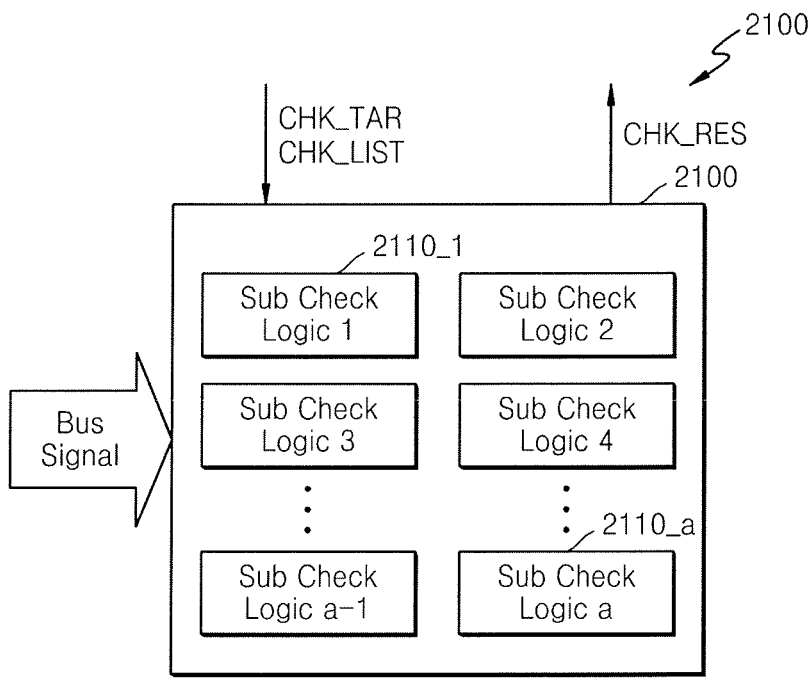
FIG. 5 is a block diagram showing check logic of FIG. 4 according to an exemplary embodiment of the inventive concept.
Figure 6:
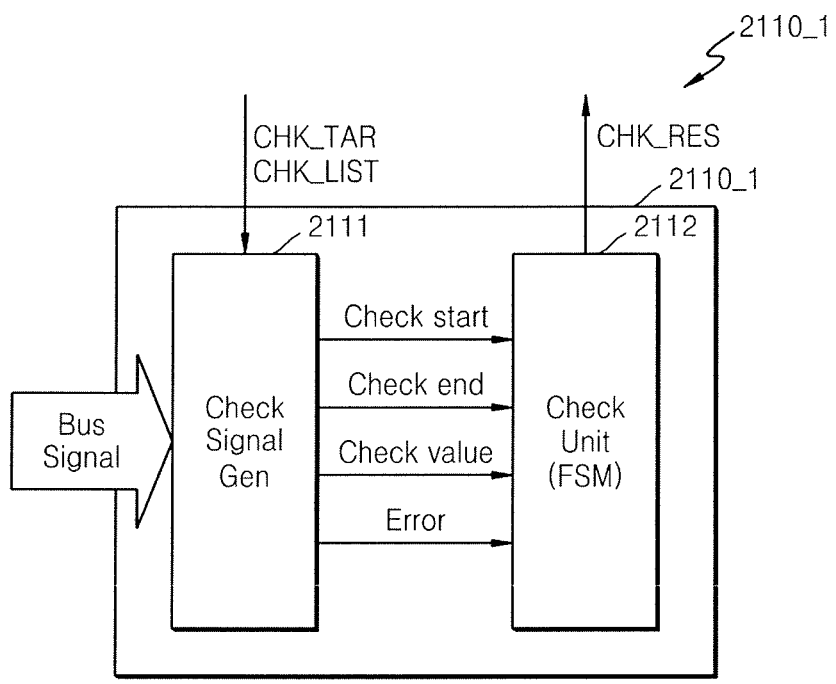
FIG. 6 is a block diagram showing sub-check logic of FIG. 5 according to an exemplary embodiment of the inventive concept.

A detailed example and operations of the check logic 2100 will be described below with reference to FIGS. 5 and 6. FIG. 5 is a block diagram showing an example of the check logic 2100 according to an exemplary embodiment of the inventive concept, and FIG. 6 is a block diagram of a sub-check logic shown in FIG. 5 according to an exemplary embodiment of the inventive concept.

As shown in FIG. 5, the check logic 2100 may include a plurality of sub-check logics 2110_1 through 2110_a. As an example, a number of sub-check logics 2110_1 through 2110_a is included in the check logic 2100, and each of the sub-check logics 2110_1 through 2110_a performs a bus protocol check operation with respect to the checking target and the checking list corresponding to the set environmental information. Since one checking target (for example, a bus signal) may include a plurality of checking lists and each of the sub-check logics 2110_1 through 2110_a performs the checking operation with respect to different checking lists, hereinafter, it will be assumed that each of the sub-check logics 2110_1 through 2110_a checks different lists (e.g., different field sets) from each other.

Each of the sub-check logics 2110_1 through 2110_a may include a functional block generating a checking signal and a function block actually executing the checking operation. For example, as shown in FIG. 6, the sub-check logic 2110_1 includes a checking signal generator 2111 and a checking unit 2112.

Each of the sub-check logics 2110_1 through 2110_a included in the check logic 2100 performs the bus protocol check operation with respect to the checking list according to set information (CHK_TAR and CHK_LIST) from the register 2200, and may perform the bus protocol check operation about another checking list when the set information CHK_TAR and CHK_LIST from the register is changed. The checking signal generator 2111 in each of the sub-check logics 2110_1 through 2110_a generates one or more checking signals of the corresponding checking list from the bus signal, and outputs the generated signals to the checking unit 2112.

According to an exemplary embodiment of the present inventive concept, the target and list of the bus protocol check operation performed in each of the sub-check logics 2110_1 through 2110_a is changed, and various checking lists are checked by using one of the sub-check logics 2110_1 through 2110_a. Accordingly, when the checking signal generator 2111 generates checking signals, the checking signals have to be unified so as to satisfy various checking lists. To do this, the checking signal generator 2111 generates predetermined kinds of checking signals from the bus signal, for example, the checking signal generator 2111 may generate checking signals including a check start signal (Check start), a check end signal (Check end), an operation signal (or check value signal Check value), and an error signal (Error). The check start signal Check start is a signal representing the start of a checking operation of the corresponding list, and the check end signal Check end denotes that the checking operation of the corresponding list has ended. Also, the operation signal Check value may be a signal including information about the actual checking operation. For example, the operation signal Check value may indicate what fields to be checked, the protocol type, the bus signal to check, etc. Also, the error signal Error may be a signal that is activated when an error occurs in the bus signal.

The checking unit 2112 performs the bus protocol check operation by using the check signals from the checking signal generator 2111. For example, the checking unit 2112 enters a checking mode in response to the receipt of the check start signal Check start, and performs the bus protocol check operation on the operation signal Check value. Also, the checking unit 2112 ends the bus protocol check operation of the operation signal Check value in response to the check end signal Check end. For example, in a case where the bus signal is a signal that is output in response to data access of predetermined bits, the checking unit 2112 checks whether data of the predetermined bits is included in the operation signal Check value. If data of 2 bits is only included in the operation signal even though an access according to a request to read data of 3 bits is performed, the checking unit 2112 outputs a checking result CHK_RES representing that there is an error with respect to the corresponding checking target and the checking list. Also, the checking unit 2112 may check whether the error signal Error is activated or not, and if the error signal Error is activated between the check start signal Check start and the check end signal Check end, the checking unit 2112 may sense the error signal Error and output the checking result CHK_RES.

Referring back to FIG. 4, the checking result CHK_RES from the checking unit 2112 is provided to the error information output logic 2300. The error information output logic 2300 generates and outputs error information based on the checking result CHK_RES, and the error information may include information about the checking target and the checking list, in which the error occurs. Also, the error information output operation from the error information output logic 2300 may be performed based on the environment information set in the environment setting register 2200. For example, if there is no need to output the error information about some of the checking targets and lists, the output of the error information may be blocked. On the other hand, if there is an error in the checking targets and lists that have priority to output the error information, the error information representing the above error may be provided via the system bus.

According to an exemplary embodiment of the present inventive concept, as the checking operation is performed by using the synthesizable bus protocol checker, the bus protocol check operation may be performed at the simulation level and the chip level. Moreover, since the checking targets and lists may vary depending on a setting, available checking area may be increased by using restricted hardware.

Figure 7:
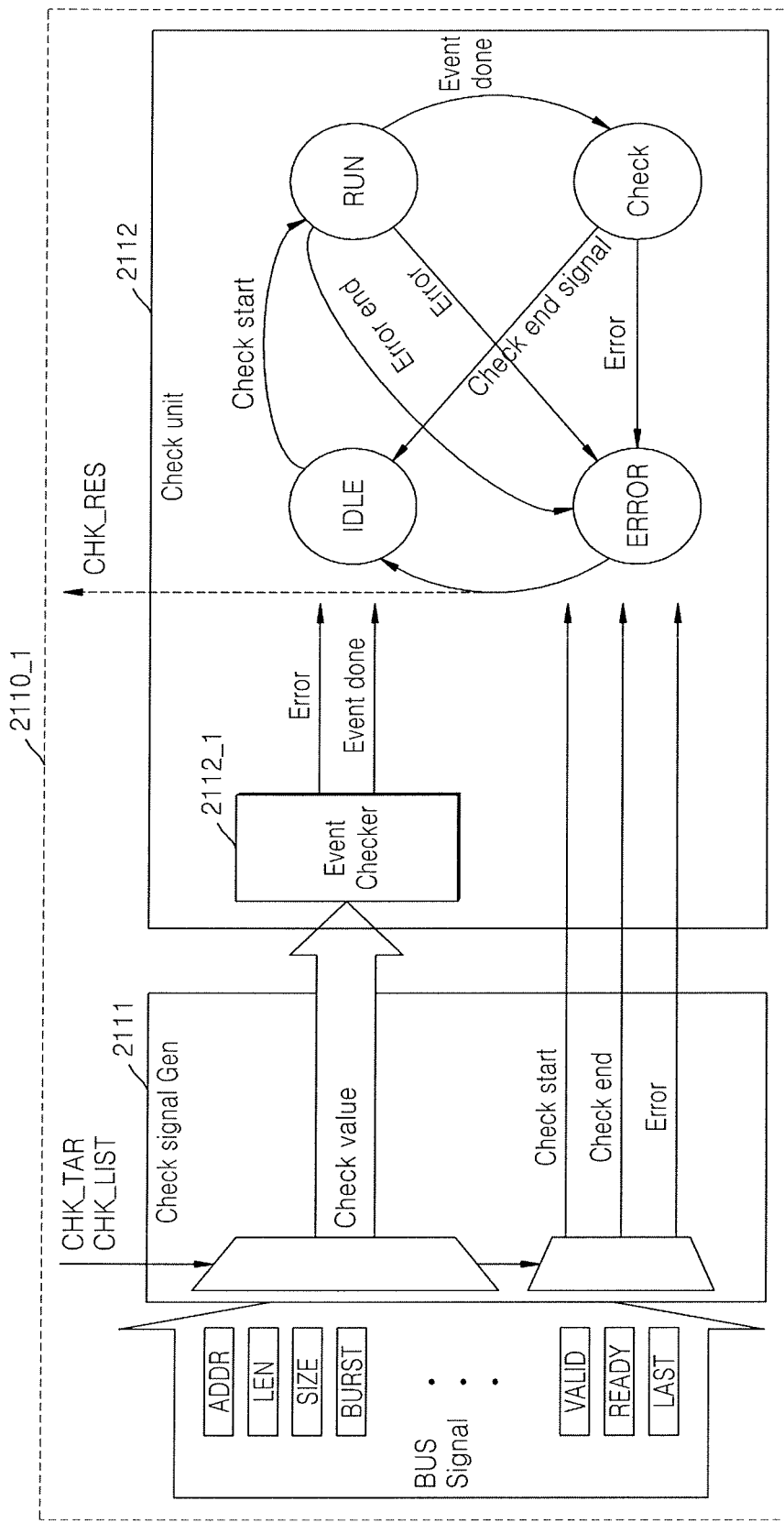
FIG. 7 is a block diagram showing the sub-check logic of FIG. 6 according to an exemplary embodiment of the inventive concept.

FIG. 7 is a block diagram showing a detailed example of a sub-check logic shown in FIG. 6 according to an exemplary embodiment of the inventive concept. As shown in FIG. 7, the sub-check logic 2110_1 includes the checking signal generator 2111 and the checking unit 2112. The checking signal generator 2111 generates and outputs check signals about the checking targets and lists corresponding to the sub-check logic 2110_1 from the bus signal, and the checking unit 2112 performs the bus protocol check operation by using the check signals output from the checking signal generator 2111. FIG. 7 shows the bus protocol operation in the checking unit 2112 as a finite state machine (FSM) type.

Setting information relating to the checking target CHK_TAR and the checking list CHK_LIST is provided to the checking signal generator 2111, and the checking signal generator 2111 generates the check signals from the signals corresponding to the checking list CHK_LIST included in the bus signal when the bus signal corresponding to the checking target CHK_TAR is received. The bus signal may include various kinds of signals defined by the bus protocol, for example, address information ADDR representing an IP that is requested to access and storage location, length information LEN of the transaction in the system, size information SIZE representing size of data, valid information VALID representing whether the data and information are available in a channel, status information READY representing a data receipt status of the IP receiving the signal, and information LAST representing that the data transferred through read/write channels is the last data.

The checking unit 2112 may include an event checker 2112_1. The event checker 2112_1 receives the operation signal Check value, and determines whether there is an error in the operation signal Check value (for example, whether the data having suitable bits for the protocol is received or not) to output an error signal Error or to output an event end signal Event done representing that a normal operation signal Check value is received.

The checking unit 2112 starts the bus protocol check operation by using the operation signal Check value and the other checking signals (for example, the check start signal Check start, the check end signal Check end, and the error signal Error. The checking unit 2112 in an idle state IDLE enters a running state RUN for executing the actual checking operation in response to the check start signal Check start. When the check end signal Check end or the error signal Error occurs in the running state RUN, it is determined that there is an error in the corresponding check target and list, and the checking unit 2112 outputs the error information and enters the idle state IDLE. Also, when the event end signal Event done is received during the running state RUN, the checking unit 2112 enters a check complete state CHECK representing that the checking operation about the operation signal Check value is finished. According to the check result, the checking unit 2112 may enter the idle state IDLE while outputting the error information, or without outputting the error information.

FIG. 8 is a table showing examples of error targets and error lists according to the checker of an exemplary embodiment of the inventive concept. As shown in FIG. 8, an identification (ID) may be assigned to each of bus signals transferred via the system bus in the SoC, and checking operations with respect to the information included in each of the bus signals according to various lists may be performed. One check target may include two or more check lists (LIST), and the bus protocol check operation may be performed with respect to various check targets and lists by using a predetermined number of sub-check logics. In FIG. 8, check lists such as length and response occurrence are checked with respect to a check target ID0, check lists such as ID information and length may be checked with respect to a check target ID1, and check lists such as response occurrence may be checked with respect to a check target ID2.

Figure 9:
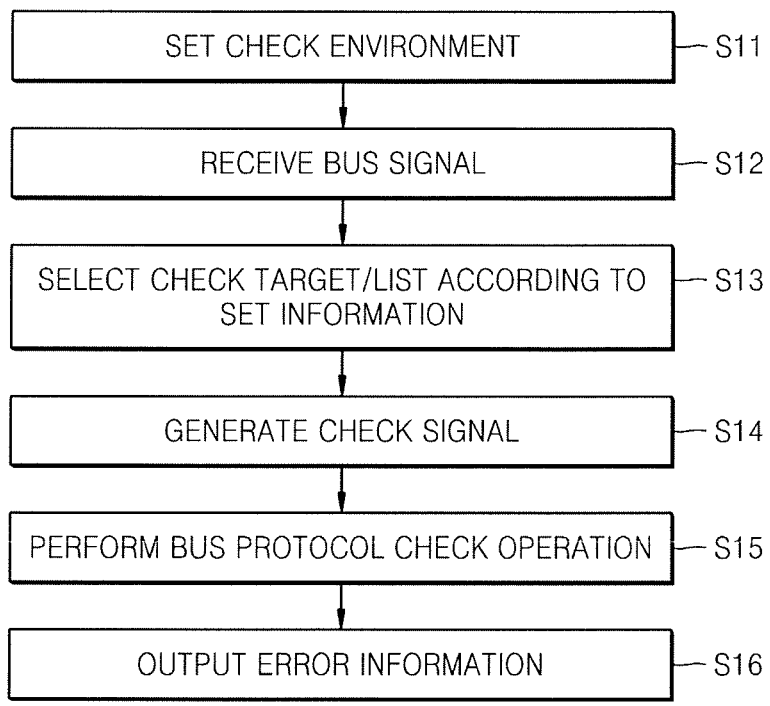
FIG. 9 is a flowchart illustrating a bus protocol check method according to an exemplary embodiment of the present inventive concept.

FIG. 9 is a flowchart illustrating a bus protocol checking method in an SoC, according to an exemplary embodiment of the present inventive concept. The SoC includes a plurality of IPs connected to a system bus, and bus protocol checkers are disposed corresponding to at least some of the plurality of IPs.

As shown in FIG. 9, according to the bus protocol checking method of the SoC, when setting information relating to the bus protocol check operation is stored in one or more environment setting registers included in the SoC, the checking environment is set (S11). The checker included in the SoC is a bus protocol checker that may be combined, and the bus protocol checker may perform the bus protocol check operation through a simulation at an RTL or in the FPGA or actual chip.

The checker receives a bus signal output from an IP (S12), and performs a checking operation for detecting a bus protocol error of the received bus signal. A check target/list is selected according to the check environment setting information to perform the bus protocol check operation (S13), and check signals are generated from the signals included in the bus signal, wherein the signals correspond to the selected check target/list (S14). For example, the checker includes a check logic that actually performs the bus protocol check operation, and the check logic includes a plurality of sub-check logics for performing the bus protocol check operations with respect to different check lists. Each of the sub-check logics may generate the check signal from a signal different from that of another sub-check logic. The check signal may include predetermined kinds of signals for satisfying various check lists. For example, the check signal may include a check start signal, a check end signal, an operation signal, and an error signal.

The bus protocol check operation is performed by using the generated check signal (S15). The bus protocol check operation starts in response to the check start signal, and may include operations of analyzing the operation signal and the error signal until the check end signal is received. For example, it may be determined that there is an error in the bus signal when the number of bits of the data included in the operation signal are different from the number of bits of the data according to a protocol regulation. In addition, if there is a level shift in the error signal that is required to be maintained at a predetermined level, it may be determined that there is an error in the bus signal. Error information according to the check result is output (S16), and the error information may include information about the check target/check list including the error.

Figure 10:
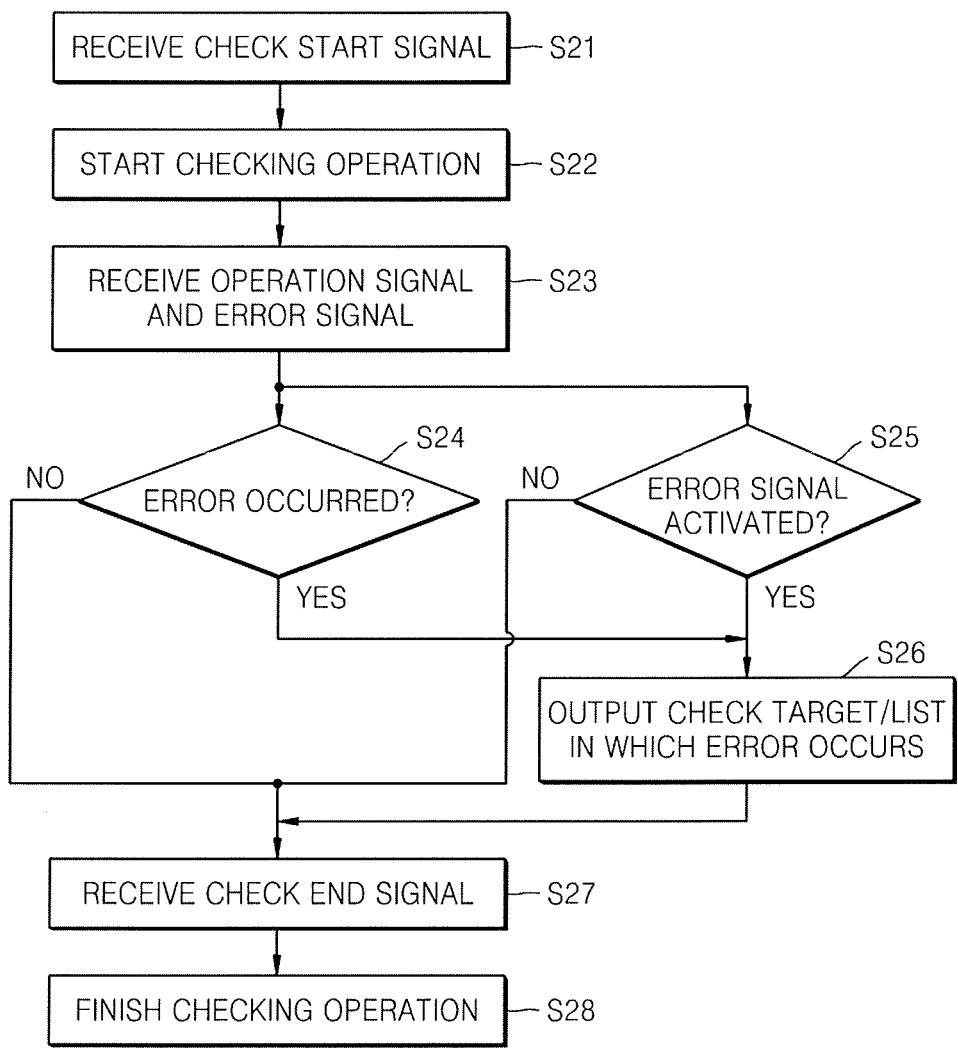
FIG. 10 is a flowchart illustrating a bus protocol checking process of FIG. 9 according to an exemplary embodiment of the inventive concept.

FIG. 10 is a flowchart illustrating a bus protocol check execution process shown in FIG. 9 according to an exemplary embodiment of the inventive concept. For example, FIG. 10 illustrates an example of operations of the checking unit that actually perform the checking operation in the check logic included in the SoC.

As described above, the sub-check logic performs the bus protocol check operation with respect to the corresponding check target and the check list, and generates the check signal from the bus signal. The check signal may include predetermined kinds of signals that are applied to various check lists, for example, the check start signal, the check end signal, the operation signal, and the error signal. The check signal is provided to the checking unit included in the sub-check logic.

The checking unit receives the check start signal (S21), and starts the bus protocol check operation in response to the check start signal (S22). After starting the check operation, the checking unit receives the operation signal and the error signal (S23), and checks whether there is a bus protocol error by analyzing the operation signal and the error signal.

It is determined whether there is an error in the information included in the operation signal as a result of analyzing the operation signal and the error signal (S24), and it is determined whether the error signal is activated, separately from the operation signal (S25). According to the determination result, if there is an error in at least one signal, information representing that the error occurs in the corresponding check target is output (S26). On the other hand, if it is determined that the operation signal and the error signal are normal, output of the information representing the occurrence of the error is blocked. After the analyzing process of the check signals as described above, the check end signal is received (S27), and accordingly, the checking operation on the bus signal is finished (S28). In an exemplary embodiment, the error signal indicates whether or not to determine whether an error has occurred, or whether or not to output error results when an occur has occurred.

Figure 11:
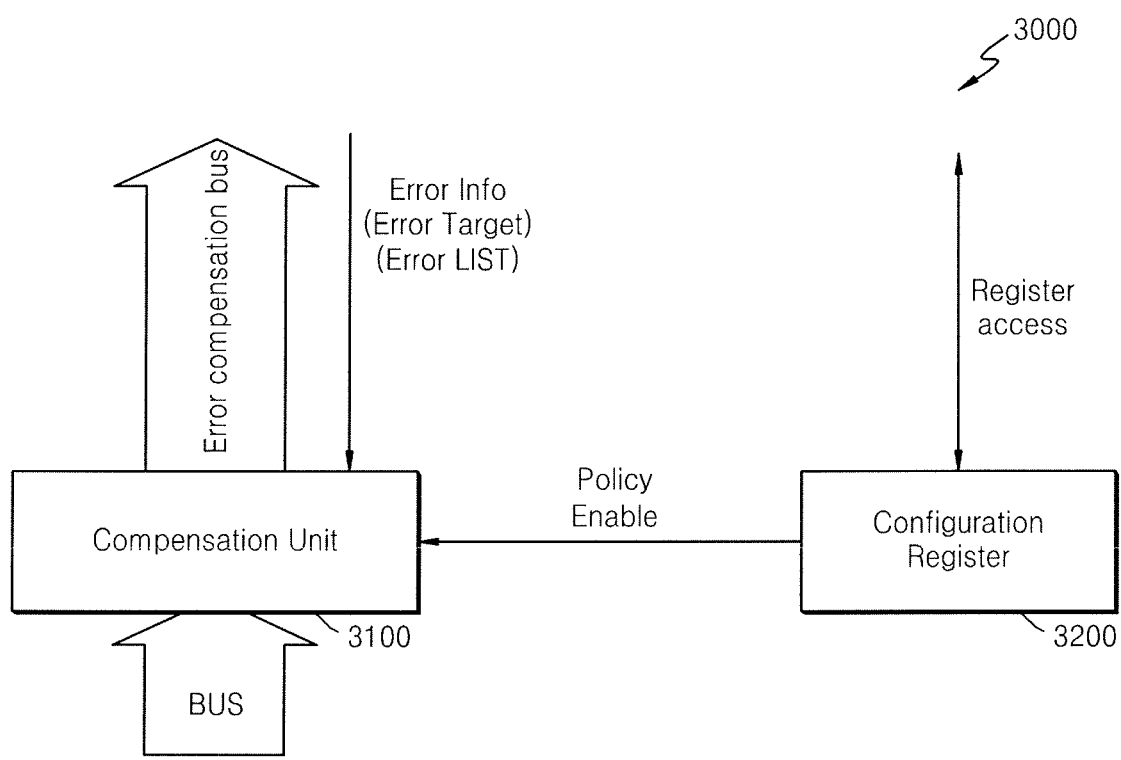
FIG. 11 is a block diagram showing a bus protocol checker of FIG. 1 according to an exemplary embodiment of the inventive concept.

FIG. 11 is a block diagram of an embodiment of the checker 1400 shown in FIG. 1, according to an exemplary embodiment of the inventive concept. In FIG. 11, the checker 1400 of FIG. 1 includes an error compensator 3000 that compensates for the bus protocol error. As an example, the checker 1400 of FIG. 1 may include the error compensator 3000 shown in FIG. 11 only, or may include the error compensator 3000 shown in FIG. 11 and the bus protocol checker described above.

As shown in FIG. 11, the error compensator 3000 includes a compensation unit 3100 and an environment setting register (e.g., a configuration register) 3200. The error compensator 3000 performs functions for compensating for the error that may exist in the bus signal transmitted from the IP, and the compensation unit 3100 generates at least a part of the information included in the bus signal to compensate for the error. Otherwise, the compensation unit 3100 may compensate for the bus protocol error by concealing that an error has occurred. For example, the compensation unit 3100 may generate a valid bus signal for the system bus 1100 when the IP provides it with an invalid bus signal. The environment setting register 3200 is a register that stores information for setting an operating environment of the error compensator

3000. When a control signal from the outside is provided to the environment setting register 3200 via the system bus, the operating environment relating to the error compensation is set, and at the same time, the operating environment may be changed due to access from the outside.

The compensation unit 3100 receives the bus signal from the IP via a first bus (for example, an IP bus), and provides a bus signal, an error of which is compensated for according to whether the error exists in the bus signal, to the system bus via a second bus (for example, an error compensation bus). The compensation unit 3100 receives error information (ErrorInfo) according to the error checking result of the bus signal from the bus protocol checker, and may compensate for the error of the bus signal in response to the received error information. As described in the previous embodiment, the error information ErrorInfo may include information relating to the check target and list (Error target and Error LIST) in which the error occurs.

Also, the compensation unit 3100 receives policy information (Policy) relating to the error compensation and activation information (Enable) from the environment setting register 3200, and performs the error compensation operation corresponding to the received policy and activation information. For example, if an error compensation operation with respect to a predetermined check target and list is disabled, the bus signal may be output to the system bus via the second bus without regard to the error information (ErrorInfo). According to the environment setting, if there are two or more check lists in the same check target, the compensation is performed with respect to the information, in which the error compensation operation is enabled, to output a compensated bus signal, and the compensation operation is not performed with respect to the information, in which the error compensation operation is disabled, to output a bus signal including an error.

Also, according to the error compensation policy, the error compensation may be performed on the bus signal received from the IP, and the compensation unit 3100 receives the bus signal from the IP that is requested to access and performs the error compensation on the bus signal in response to the error information (ErrorInfo). In this case, the error compensation is only performed on the bus signal from the IP, in which the error occurs, and the bus signal from the IP, in which the error does not occur, is transferred to the system bus without an error compensation operation.

In an exemplary embodiment, a batch type error compensation method, in which the IP generating the bus signal having the error is concealed, is performed according to the error compensation policy, and in this case, the compensation unit 3100 blocks outputting of the bus signal from the IP via the system bus and generates the bus signal by itself in response to the request transferred through the system bus and outputs the bus signal to the system bus. For example, if there is an error in the bus signal from some IPs, information representing whether the batch type error compensation will be applied to the above IPs or not is set, and after that, when the checking operation for the corresponding IPs is performed, the compensation unit 3100 generates the bus signal by using the batch type error compensation method. The information about the compensation method and the IPs to which the compensation method will be applied may be stored in the environment setting register 3200. Accordingly, the corresponding IPs may be concealed in the SoC, and an occurrence of an entire system operation stop and check operation stop due to the occurrence of the bus protocol error in one IP may be prevented.

Figure 12:
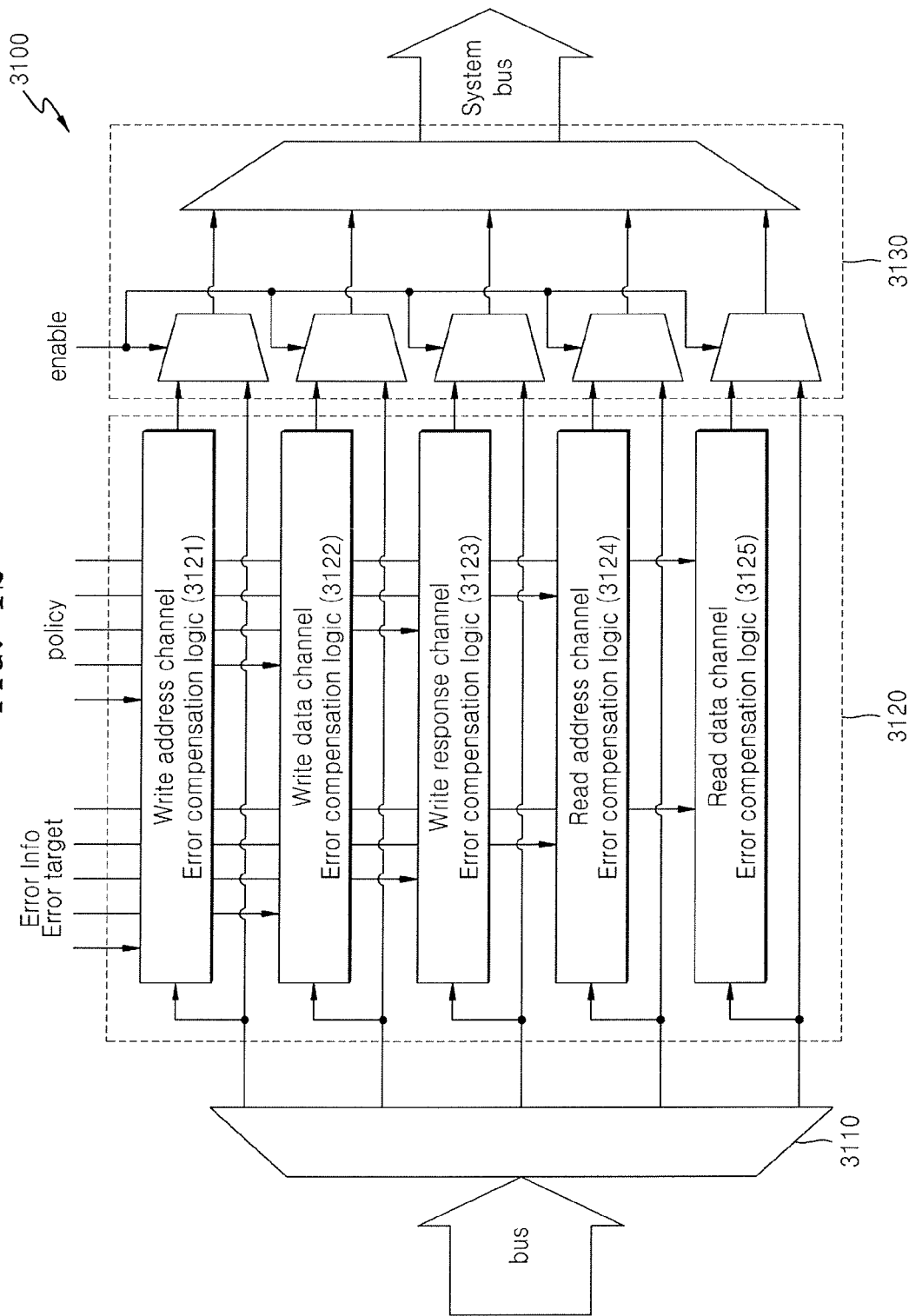
FIG. 12 is a block diagram showing a compensation unit of an error compensator of FIG. 11 according to an exemplary embodiment of the inventive concept.

FIG. 12 is a block diagram showing an embodiment of the compensation unit 3100 in the error compensator shown in FIG. 11 according to an exemplary embodiment of the inventive concept. As shown in FIG. 12, the compensation unit 3100 includes error compensation logic 3120 for compensating for errors of various signals included in the bus signal. For example, when the AXI protocol is applied, channels transmitting the bus signal may include a write address channel, a write data channel, a write response channel, a read address channel, and a read data channel. The compensation unit 3100 may include error compensation units corresponding to the above channels, respectively. Accordingly, the error compensation logic 3120 includes a write address error compensation logic 3121 for compensating for an error occurring in the write address list, a write data error compensation logic 3122 for compensating for an error occurring in the write data list, a write response error compensation logic 3123 for compensating for an error occurring in the write response list, a read address error compensation logic 3124 for compensating for an error occurring in the read address list, and a read data error compensation logic 3125 for compensating for an error occurring in the read data list. Although not shown in FIG. 12, additional error compensation logics for compensating for an error occurring in other signals included in the bus signal may be further present.

The compensation unit 3100 further includes a first passage selection unit 3110 that provides signals included in the bus signal to corresponding error compensation logics. For example, the first passage selection unit 3110 may include a demultiplexer. Various signals included in the bus signal may be transferred via different channels in the system bus, and the first passage selection unit 3110 outputs the signals included in the bus signal to the error compensation logics corresponding to the signals, respectively. Also, the compensation unit 3100 further includes a second passage selection unit 3130 for outputting the bus signal, of which an error is compensated (or error is not compensated for according to a policy), to the system bus. The second passage selection unit 3130 may include a plurality of first multiplexers for outputting the bus signal, the error of which is compensated for, and the bus signal, the error of which is not compensated for, selectively, and may further include a second multiplexer for providing the system bus with the bus signals output from the first multiplexers.

The error information Error Info relating to the error target and list is provided to the error compensation logics 3120, and each of the error compensation logics 3120 performs the error compensation operation on the corresponding signal in response to the error information Error Info. Also, it is determined whether the partial error compensation method is used or the batch type error compensation method is used according to the error compensation policy, and it is selected whether the error compensated bus signal will be output or the bus signal that has undergone no error compensation will be output according to the error compensation enabling information (Enable).

If the partial error compensation method is applied, each of the error compensation logics 3120 performs the error compensation operation on the bus signal transmitted from the IP, for example, if there is an error in the write data, the write data error compensation logic 3122 generates arbitrary write data to newly configure the bus signal and to transfer the bus signal to the system bus via the second passage selection unit 3130. On the other hand, if the batch type error compensation method is applied, each of the error compensation logics 3120 blocks the bus signal transmitted from the IP to be output from the system bus, and the error compensation logics 3120 generate the bus signal and transmits the bus signal to the system bus via the second passage selection unit 3130.

Figure 13:
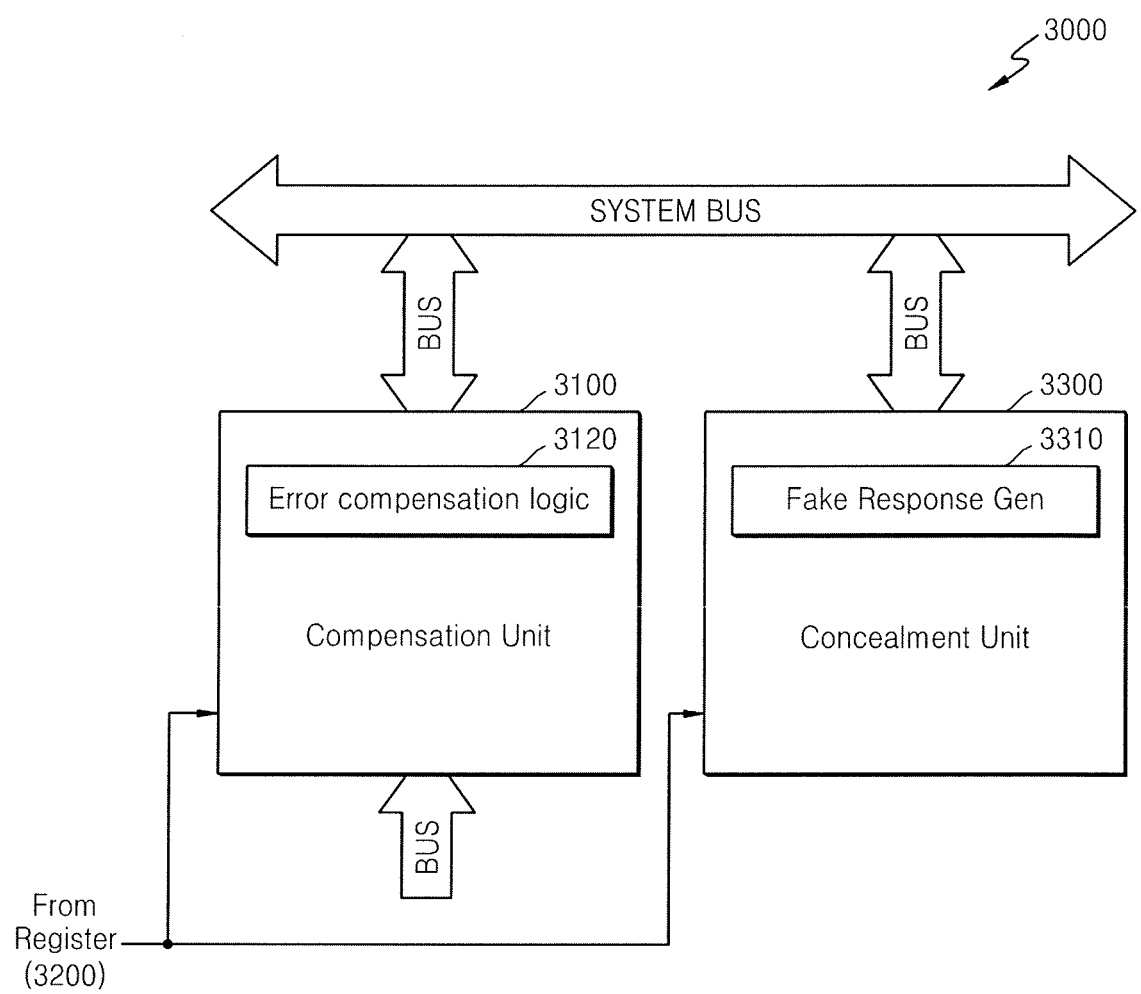
FIG. 13 is a diagram showing the error compensator of FIG. 11 according to an exemplary embodiment of the inventive concept.

FIG. 13 shows an embodiment of the error compensator 3000 shown in FIG. 11 according to an exemplary embodiment of the inventive concept. In FIG. 12, the error compensation logic operates according to the partial error compensation method or the batch type error compensation method by the error compensation policy. However, in FIG. 13, the partial error compensation and the batch type error compensation are performed by different functional blocks.

As shown in FIG. 13, the error compensator 3000 includes a compensation unit 3100 and a concealing unit 3300. The compensation unit 3100 may include a plurality of error compensation logics 3120. Also, the concealing unit 3300 may include one or more fake response generators 3310. The information about the error compensation policy is provided to the compensation unit 3100 and the concealing unit 3300 from a register 3200, and accordingly, one of the compensation unit 3100 and the concealing unit 3200 may be activated. If the compensation unit 3100 is activated, the error compensation operation of the bus signal is performed according to the error information from the bus protocol checker (not shown), and the error compensated bus signal is output to the system bus.

Otherwise, the concealing unit 3300 is activated according to an environment setting, and in this case, access to the corresponding IP is blocked, and if a request for accessing the corresponding IP is generated, the fake response generator 3310 generates a fake response and outputs the fake response to the system bus. For example, if a bus signal for accessing the corresponding IP from another IP is provided to the error compensator 3000 via the system bus, the access to the corresponding IP is skipped, and the fake response generator 3310 generates and outputs the fake response to conceal the IP generating the bus signal having an error in the SoC.

Figure 14A:
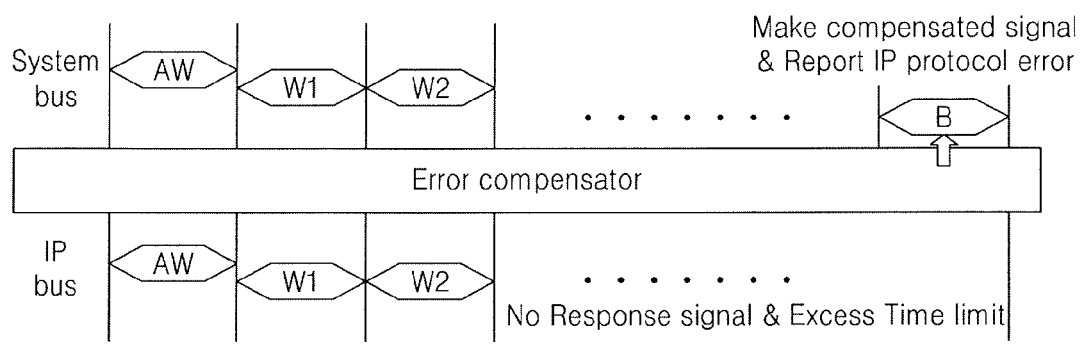
FIGS. 14A and 14B are diagrams showing signal transfer processes according to an error compensation policy.
Figure 14B:
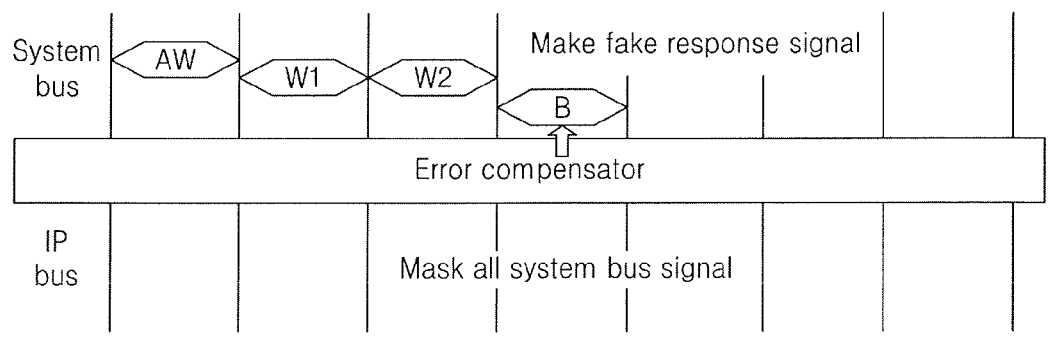

FIGS. 14A and 14B are diagrams showing examples of a signal transferring process according to the error compensation policy. Referring to FIG. 14A, if the partial error compensation method is applied, the signal is transferred via the system bus and the IP bus, and the bus protocol error checking operation is performed on the bus signal of an IP transferred via the IP bus, and the checking result is provided to the error compensator 3000. If there is no response signal and a predetermined time period has expired, the error compensator 3000 generates an error compensated bus signal and outputs the bus signal through the system bus. In addition, the error information about the checking target and list, in which the error occurs, may be output through the system bus. In this case, a system operation stop caused when the bus signal from the IP as a response signal is not transferred may be prevented.

Referring to FIG. 14B, the error compensator 3000 generates a fake response signal without accessing the corresponding IP in response to the access request to the corresponding IP received through the system bus, and outputs the fake response signal through the system bus. That is, transferring of the signal to the IP generating the bus signal having an error through the system bus is blocked, and at the same time, the error compensator 3000 outputs the fake response signal to the system bus in response to the access request.

Figure 15:
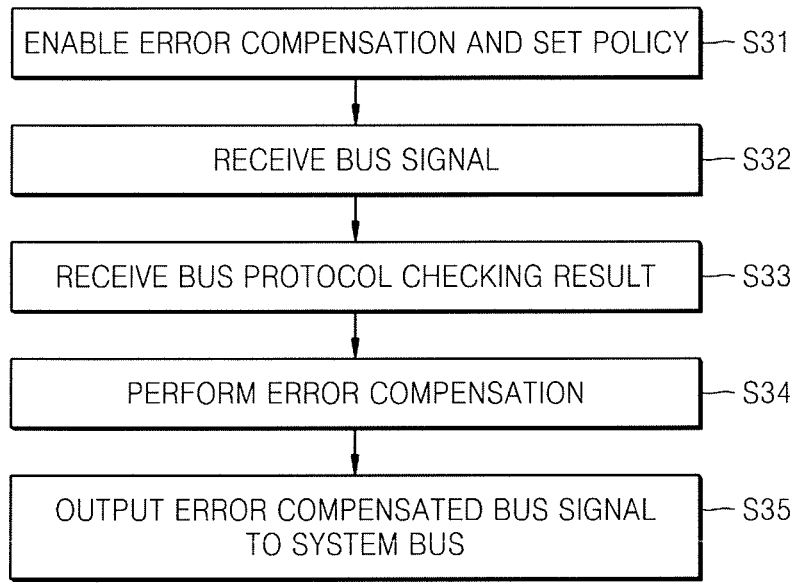
FIGS. 15 and 16 are flowcharts illustrating error compensating operations according to an exemplary embodiment of the present inventive concept.
Figure 16:
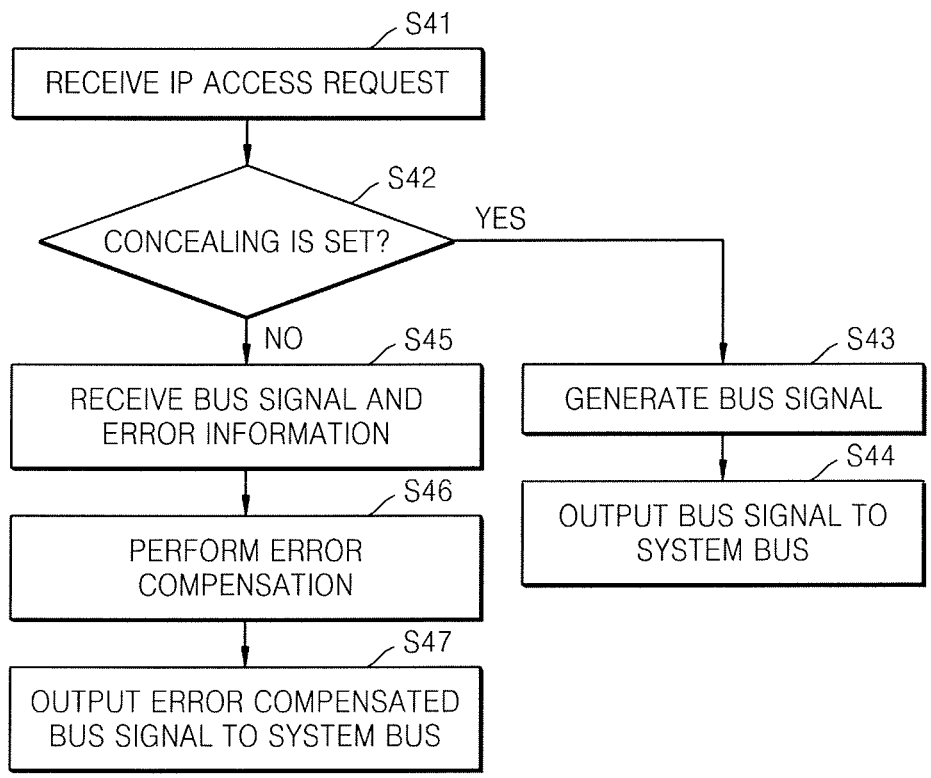

FIGS. 15 and 16 are flowcharts illustrating embodiments of an error compensation process according to an exemplary embodiment of the present inventive concept. FIG. 15 illustrates the error compensation process in a case where a partial error compensation method is applied, and FIG. 16 illustrates the error compensation process in a case where the partial error compensation method and the batch type error compensation method are selectively applied.

As shown in FIG. 15, the enabling information and the policy information regarding the error compensation are set in the register (S31), and an error compensation environment is set according to the information set in the register. After that, a bus signal output from an IP that is requested to access is received (S32), and a bus protocol check operation about the bus signal is performed by the bus protocol checker. Accordingly, the bus protocol checking result is received (S33).

The error compensator performs an error compensation on the received bus signal, for example, performs the error compensation operation on the bus signal with respect to the check target and list in which the error occurs based on the bus protocol check result (S34). Accordingly, the bus signal, in which the error is compensated for, is output to the system bus (S35). As described above, in a case where the error compensation operation is disabled, the error compensation of the bus signal is not performed, or a bus signal, of which the error compensation is skipped, between the error compensated bus signal and the bus signal skipping the error compensation is selectively output to the system bus.

As shown in FIG. 16, an access request to the corresponding IP is received through the system bus (S41), and it is determined whether the concealing policy is set as the error compensation policy with respect to the corresponding IP that is requested to access (S42). As a result of the determination, if the concealing policy is set with respect to the corresponding IP, the corresponding IP is not accessed, but the error compensator generates a bus signal in response to the access request (S43). The bus signal generated as a fake response signal is output to the system bus (S44).

As a result of the determination, if the concealing policy is not set with respect to the corresponding IP, a bus signal is received from the corresponding IP in response to the access request, and the error information representing the bus protocol checking result is received from the bus protocol checker (S45). The error compensation is performed with respect to the check target and list in which the error occurs according to the error information (S46), and the error compensated bus signal is output to the system bus (S47).

Figure 17A:
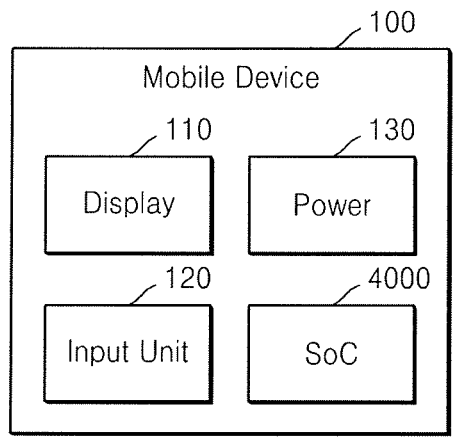
FIGS. 17A and 17B are block diagrams showing a device to which an SoC according to an exemplary embodiment of the present inventive concept is applied.
Figure 17B:
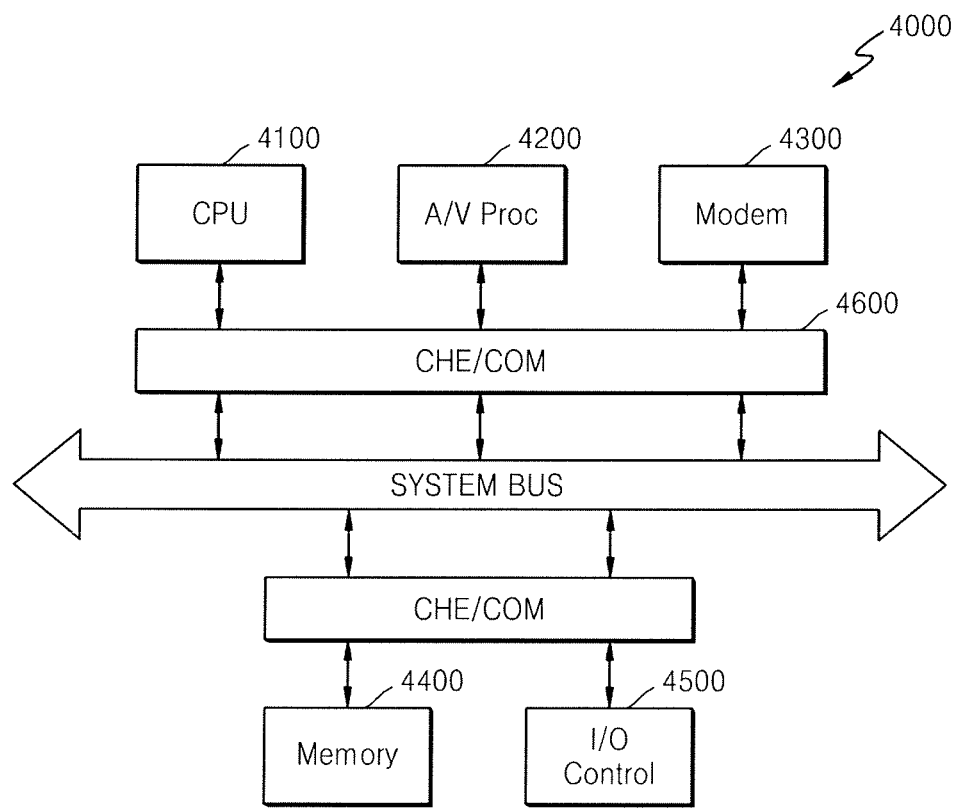

FIGS. 17A and 17B are block diagrams showing embodiments of a device to which an SoC according to an exemplary embodiment of the present inventive concept is applied. FIG. 17A shows a device to which the SoC according to the present inventive concept is applied, and FIG. 17B shows an example of realizing the SoC shown in FIG. 17A.

An SoC 4000 according to at least one embodiment of the present inventive concept may be applied to a device 100, such as a mobile device. The device 100 may include a display unit 110 for displaying a user interface, an input unit 120, such as a keypad or a touch screen for receiving a user input, and a power management unit 130 for controlling power supply to the device 100. The device 100 may be a mobile phone, a smartphone, an audio device, such as an MP3 player, a notebook computer, and a tablet PC, and various components according to functions thereof may be further disposed in the device 100.

In addition, as shown in FIG. 17B, the SoC 4000 may be realized by integrating IPs for performing various functions in one semiconductor chip, for example, the SoC 4000 may include a CPU 4100 connected to the system bus, an audio/video processor 4200, a modem 4300 for performing wired/wireless communication, a memory 4400 for storing external system information and/or user information, and an input/output interface 4500 as IPs. However, the present inventive concept is not limited thereto. For example, some of the IPs shown in FIG. 17B may be omitted from the SoC 4000 and other IPs may be further disposed in the SoC 4000.

The SoC 4000 may include a checker 4600 according to at least one embodiment of the present inventive concept. As described above, the checker 4600 is a checker that may be combined, and includes an environment setting register (not shown) therein. The settings of the check target and list that will be checked by the checker 4600 may be changed from outside according to the information stored in the environment setting register, and the checker 4600 may perform an error compensation operation on the bus signal, in addition to the bus protocol check operation. As described above, the checker 4600 may be disposed to correspond to each of the IPs included in the SoC 4000, or may be disposed to correspond to some of the IPs included in the SoC 4000. Also, in a case of the error compensation operation, the partial error compensation method, in which the compensation process is performed with respect to the target and list on the bus signal from the IP, or the batch type error compensation method, in which the access from the IP is blocked and a fake response signal is generated by the error compensator, may be applied.

Figure 18A:
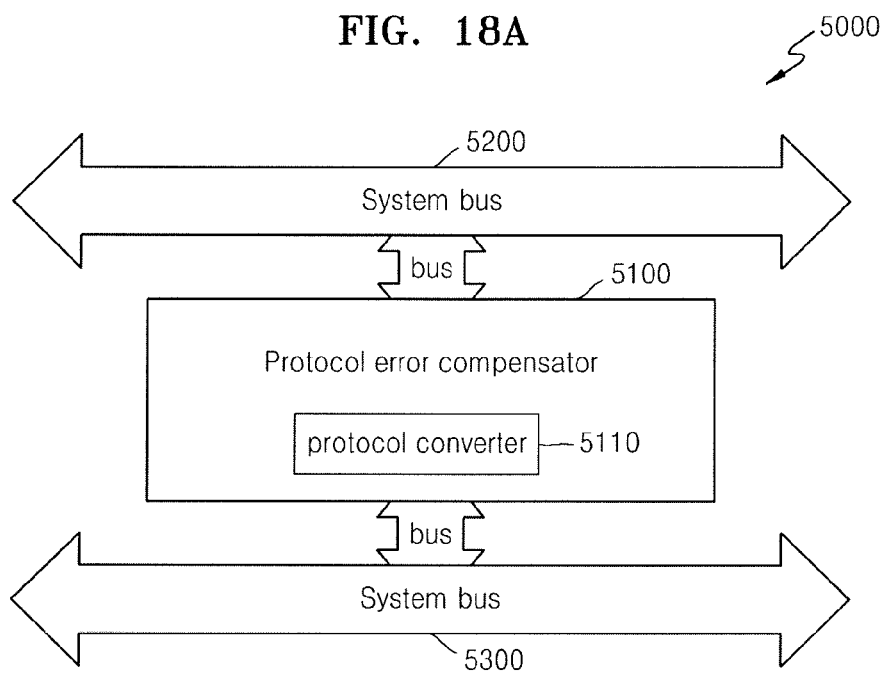
FIGS. 18A and 18B are block diagrams showing a bus protocol error compensator according to an exemplary embodiment of the present inventive concept.
Figure 18B:
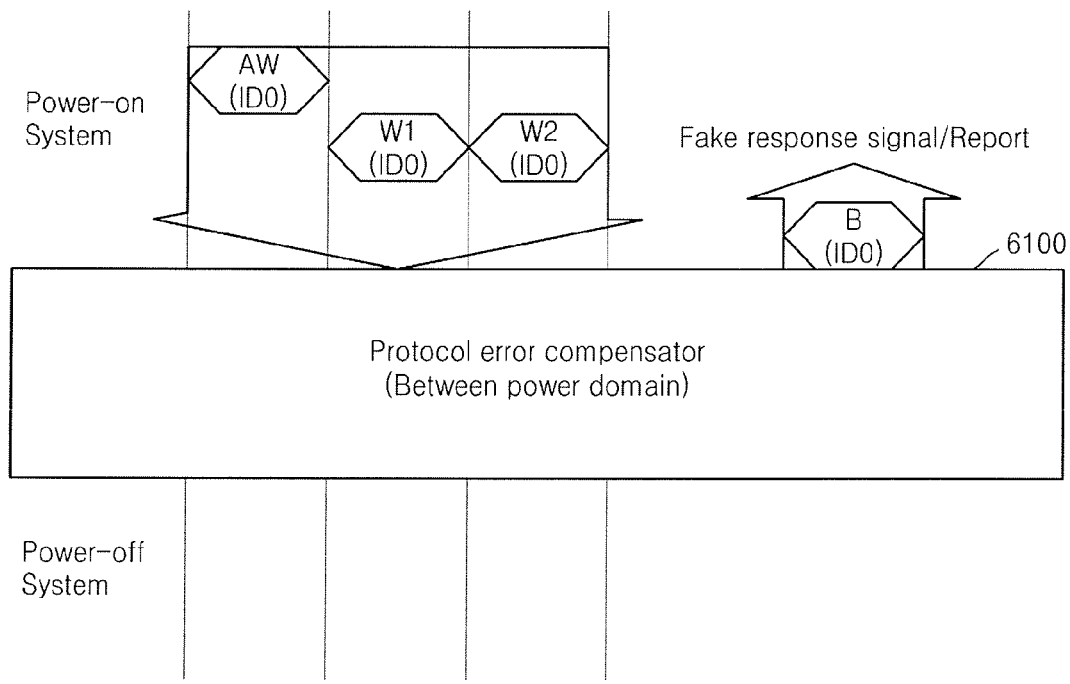

FIGS. 18A and 18B are block diagrams showing a bus protocol error compensator 5100 according to an exemplary embodiment of the present inventive concept. As shown in FIG. 18A, an SoC 5000 includes the bus protocol error compensator 5100, and the bus protocol error compensator 5100 is connected to at least two system buses, namely, first and second system buses 5200 and 5300. For example, the first and second system buses 5200 and 5300 may be disposed in the SoC 5000. Also, the bus protocol error compensator 5000 is shown in FIGS. 18A and 18B, and the checker according to the above embodiment may be further disposed.

The first and second system buses 5200 and 5300 may transmit/receive signals according to predetermined protocols, for example, protocols such as AXI4 and ACE as AMBA2/3/4 relating protocol. Also, the first and second system buses 5200 and 5300 may send/receive the signals according to different protocols.

The bus protocol error compensator 5100 may transfer the signal by converting the protocol when signals are sent/received via the first and second system buses 5200 and 5300, and accordingly, the signals may be sent/received according to the protocols applied to the first and second system buses 5200 and 5300, respectively. To do this, the bus protocol error compensator 5100 may include a protocol converter 5110. When the bus protocol error compensator 5100 receives the signal according to a first protocol and converts the protocol into a second protocol to transmit the signal according to the second protocol, the error compensation described above is performed with respect to the signal according to the first protocol. Then, the protocol of the signal generated according to the error compensation is converted so that the signal may be transmitted according to the second protocol.

In addition, as shown in FIG. 18B, at least some of the IPs in the SoC may operate in a power-on mode, and the other IPs may be in a power-off mode. In this case, if a signal is provided from an IP in the power-on mode to a bus protocol error compensator 6100, even when the bus protocol error compensator 6100 transfers the signal to a corresponding IP in the power-off mode, the bus protocol error compensator 6100 does not receive a response signal since the IP is in the power-off mode. In this case, the bus protocol error compensator 6100 generates a fake response signal and transmits the fake response signal to the IP in the power-on mode. Otherwise, the bus protocol error compensator 6100 may store information of the IPs in the power-off mode therein. Thus, if the IP that is requested to transfer (and respond) a signal is in the power-off mode, the bus protocol error compensator 6100 generates a fake response signal and provides the IP in the power-on mode with the generated fake response signal without transmitting the signal to the IP in the power-off mode. Also, the bus protocol error compensator 6100 may provide information representing that the corresponding IP is in the power-off mode to the IP in the power-on mode.

While the inventive concept has been particularly shown and described with reference to exemplary embodiments thereof, it will be understood that various changes in form and details may be made therein without departing from the spirit and scope of the inventive concept.

What is claimed is:

1. A system on chip (SoC) comprising:
a system bus;
a plurality of intellectual properties (IPs) configured to output bus signals via the system bus; and
at least one checker disposed to correspond to at least some of the plurality of IPs,
wherein each checker comprises:
a first environment setting register configured to set information about a check target and list, on which a bus protocol check operation will be performed; and
a check logic configured to receive one of the bus signals and perform a bus protocol check operation on a signal included in the bus signal according to the information set in the first environment setting register,
wherein the checker further comprises an error compensator that compensates for a bus protocol error by performing a bus protocol error compensation operation on a corresponding received one of the bus signals to generate an error compensated bus signal,
wherein the check logic comprises a plurality of sub-check logics configured to perform bus protocol check operations with respect to different check lists,
wherein each of the plurality of the sub-check logics comprises:
a checking signal generator configured to generate check signals with respect to corresponding check lists from the bus signal; and
a checking unit configured to perform the bus protocol check operation with respect to the corresponding check list by using the check signals and outputting a check result.

2. The SoC of claim 1, wherein the checker further comprises an error information output logic configured to output error information including information about the check target and list, in which an error occurs, in response to a result of the bus protocol check operation from the check logic.

3. The SoC of claim 1, wherein each of the plurality of sub-check logics changes a check list that will undergo a bus protocol check operation according to a change in the information set in the first environment setting register.

4. The SoC of claim 1, wherein the plurality of the sub-check logics generate the same kind of check signals with respect to different check lists.

5. The SoC of claim 4, wherein the checking signal generator generates a check start signal, a check end signal, an operation signal, and an error signal as the check signals from the signals corresponding to the check lists from among the signals included in the bus signal.

6. A mobile device comprises a system on chip (SoC) according to claim 1.

7. A system on chip (SoC) comprising:
a system bus;
a plurality of intellectual properties (IPs) configured to output bus signals via the system bus; and
at least one checker disposed to correspond to at least some of the plurality of IPs, wherein each checker comprises:
a first environment setting register configured to set information about a check target and list, on which a bus protocol check operation will be performed; and
a check logic configured to receive one of the bus signals and perform a bus protocol check operation on a signal included in the bus signal according to the information set in the first environment setting register,
wherein the checker further comprises an error compensator that compensates for a bus protocol error by performing a bus protocol error compensation operation on a corresponding received one of the bus signals to generate an error compensated bus signal,
wherein the error compensator comprises:
a second environment setting register configured to set information about a target and a list, a bus protocol error of which is to be compensated for; and
a compensation unit configured to perform the bus protocol error compensation operation according to the information set in the second environment setting register, and output the error compensated bus signal to the system bus.

8. The SoC of claim 7, wherein the compensation unit receives a bus signal from an IP that has received a request for access via an IP bus, and performs the bus protocol error compensation according to a bus protocol check result on the bus signal.

9. The SoC of claim 7, wherein the compensation unit receives an access request signal via the system bus, generates a fake response signal in response to the access request signal, and outputs the fake response signal to the system bus as the error compensated bus signal.

10. The SoC of claim 7, wherein the compensation unit comprises a plurality of error compensation logics for performing error compensation operations on signals transferred through different channels.

11. The SoC of claim 10, wherein the compensation unit further comprises a passage selection unit that selectively outputs one of a bus signal with error compensation and the bus signal without error compensation, according to the information set in the second environment setting register.

12. A mobile device comprises a system on chip (SoC) according to claim 7.

13. A bus protocol checker comprising:
a check logic connected between a system bus in a system on chip (SoC) and an intellectual property (IP);
an environment setting register configured to set information about a check target and list, on which a bus protocol check operation will be performed; and
an error information output logic configured to output error information according to a bus protocol check result from the check logic,
wherein the check logic comprises a plurality of sub-check logics configured to perform bus protocol check operations with respect to check lists according to the information set in the environment setting register, from among a plurality of check lists,
wherein each of the plurality of the sub-check logics comprises a checking signal generator that generates the same kind of check signals with respect to different check lists.

14. The bus protocol checker of claim 13, wherein the check logic changes the check lists, on which the bus protocol check operations will be performed, in response to a change in settings of the environment setting register.

15. The bus protocol checker of claim 13, wherein the plurality of sub-check logics perform bus protocol check operations with respect to different check lists on the bus signal output from the IP.

16. The bus protocol checker of claim 15, wherein a code used in the bus protocol check operation represents hardware that is available at a register transfer level (RTL) and a gate level.

* * * * *